Oct. 8, 1946.  W. P. LEAR  2,409,130
RADIO AZIMUTH COMPENSATOR
Filed Oct. 31, 1942  4 Sheets-Sheet 1

FIG.I.

INVENTOR
William P. Lear
BY
Richard A. Marsen
ATTORNEY

Oct. 8, 1946.                    W. P. LEAR                    2,409,130
                         RADIO AZIMUTH COMPENSATOR
                    Filed Oct. 31, 1942        4 Sheets-Sheet 4

INVENTOR
William P. Lear
BY Richard A. Marson
ATTORNEY

Patented Oct. 8, 1946

2,409,130

UNITED STATES PATENT OFFICE 2,409,130

RADIO AZIMUTH COMPENSATOR

William P. Lear, Piqua, Ohio, assignor, by mesne assignments, to Lear, Incorporated, Grand Rapids, Mich., a corporation of Illinois Application October 31, 1942, Serial No. 464,016

15 Claims. (Cl. 250—11)

This invention relates to novel means for compensating for quadrantal errors occurring in practical radio direction finding, affording directional indications that are correct bearings in azimuth.

In accordance with the present invention I provide a flexible member, such as an endless spring, that is readily adjustable to constitute an accurate cam surface, whereby the corrector mechanism effects the accurate resultant bearings. Novel structural arrangements are incorporated to coact with the cam surface in order to reproduce the required indications for all positions of the rotatable directional antenna. The invention contemplates a compact, rugged and fool-proof quadrantal error corrector to withstand the rigid service requirements aboard an aircraft. The compensator action of the corrector may be readily readjusted in the field without dismantling. The corrector of the present invention may be used to provide compensated bearing indications that are correct to within a fraction of a degree.

The above and further advantages, capabilities and objects of the present invention will become apparent from the following description of a preferred exemplification thereof, illustrated in the drawings, in which.

Figure 9:
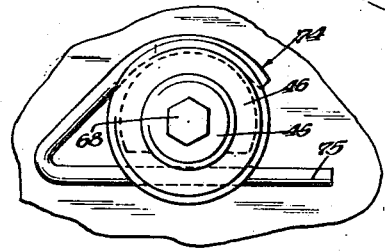
Figure 8:
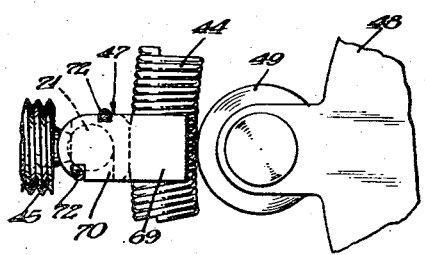
Figure 7:
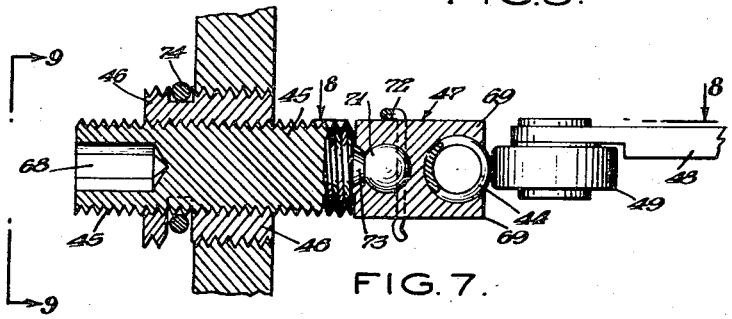
Fig. 7 is an enlarged cross-sectional detail of a corrector cam adjusting member as taken along the line 7—7 of Fig. 3.

Figs. 8 and 9 are details of the member of Fig. 7, taken respectively along the lines 8—8 and 9—9 thereof.

Figure 1:
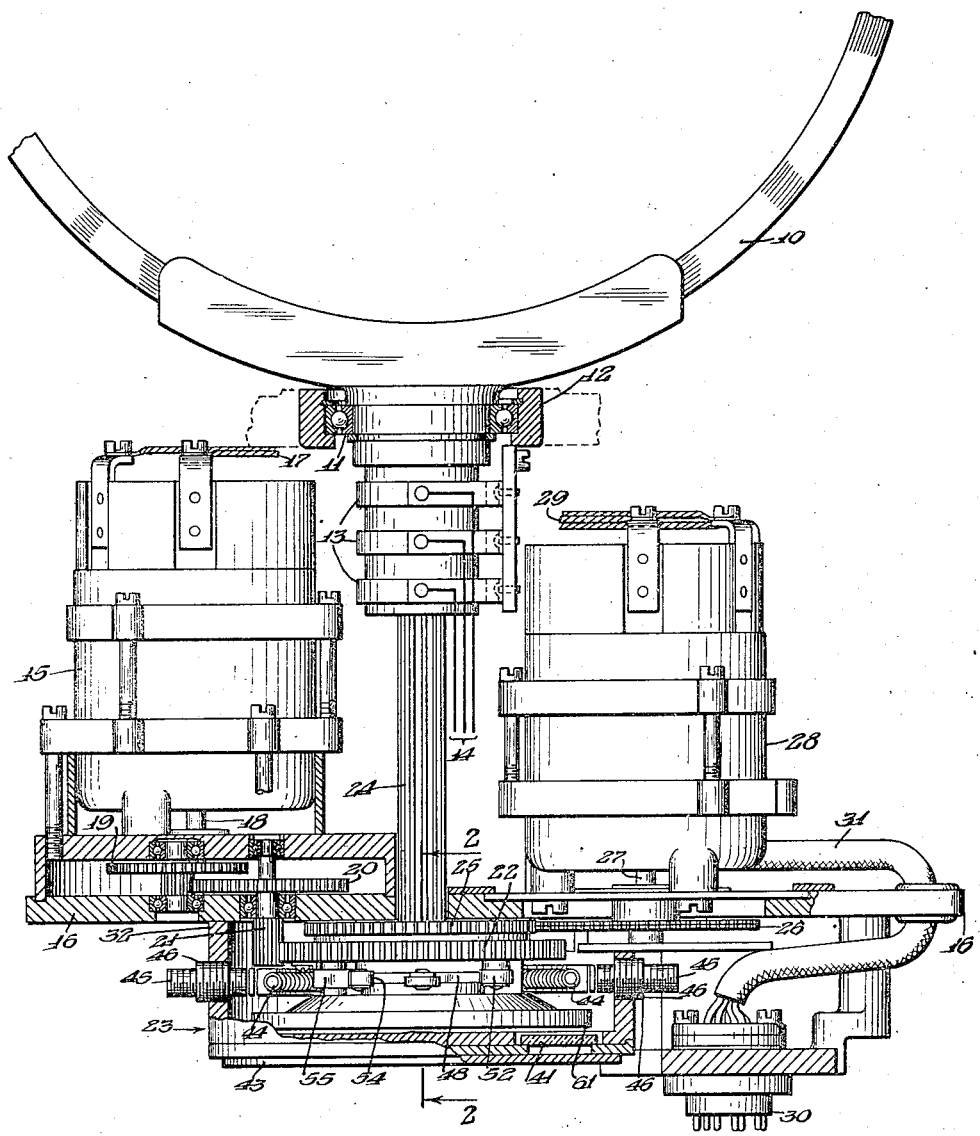
Fig. 1 is an assembly view of the directional antenna and associated mechanism incorporating the quadrantal error corrector of the invention.
Figure 2:
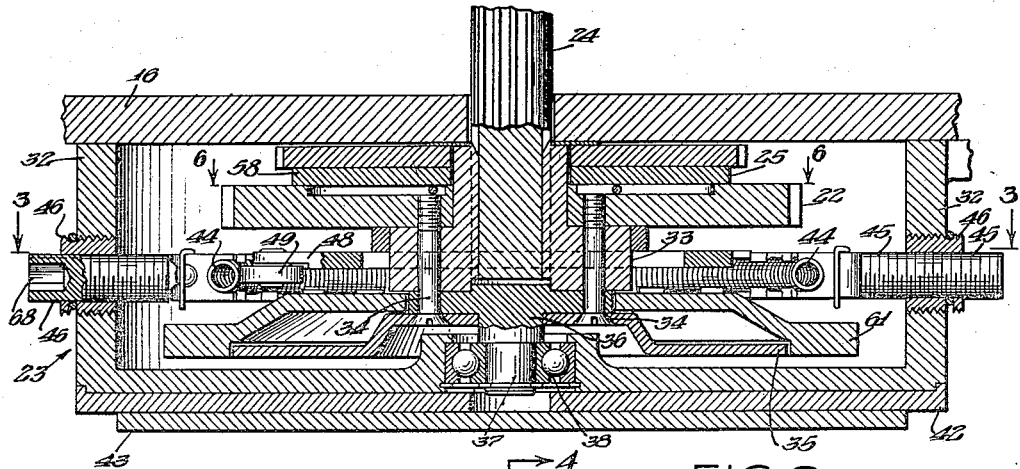
Fig. 2 is an enlarged vertical cross-sectional view through the corrector, taken along the line 2—2 of Fig. 1.

Referring to Fig. 1, the rotatable directional antenna is shown as a loop winding 10, rotatably supported by roller bearing 11 mounted in frame 12. The usual slip ring connections to the loop winding 10 are indicated at 13, communicating with leads 14 that are connected to the input of the radio direction finder circuit. A suitable direction finder is shown in my Patent No. 2,308,-521, which issued on January 19, 1943, entitled "Automatic radio direction indicator." Directional antenna 10 is oriented by loop drive motor 15 supported on mounting plate 16 of the assembly. Motor 15 may be an alternating current or direct current type, in accordance with the circuit design of the radio direction finder, and is connected to the circuit by leads indicated at 17. The motor drive shaft 18 is coupled to the loop antenna 10 through gearing 19, 20 which drives pinion 21. Pinion 21 in turn meshes with loop drive gear 22 in the quadrantal error corrector unit 23.

Loop drive gear 22 is secured to loop shaft 24 in a manner to be described in more detail hereinafter. The output, or position repeater, gear 25 of corrector unit 23 meshes with position transmitter drive gear 26. Gear 26 is connected to shaft 27 of repeater transmitter unit 28. Unit 28 is an electrical position transmitter, such as a Selsyn telemetering unit, and is coupled to a corresponding remote Selsyn receiver or repeater unit through cable 29. The Selsyn repeater, not shown, accurately translates the angular position of transmitter shaft 27 at any remote point, such as in the pilot's cabin. Several position repeaters may be coupled to transmitter 28, each of which will indicate correctly compensated bearings. A multiple connection plug 30 is mounted on frame 16, and is used to connect drive motor 15 and position transmitter 28 with the remainder of the electrical system, through cable 31. A second plug, not shown, is preferably used to connect loop antenna 10 to the radio circuit input, through leads 14.

Figure 3:
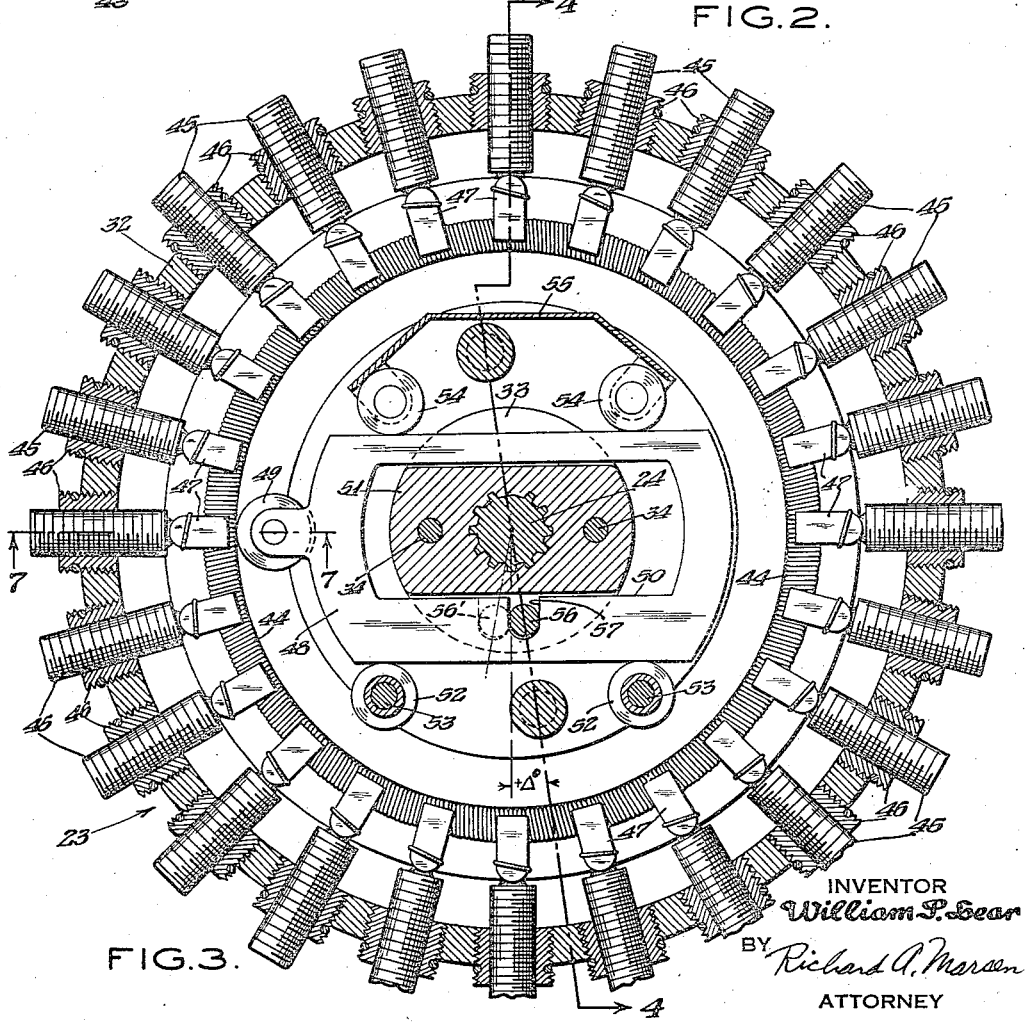
Fig. 3 is a horizontal cross-sectional view through the corrector, taken along the line 3—3 of Fig. 2.
Figure 6:
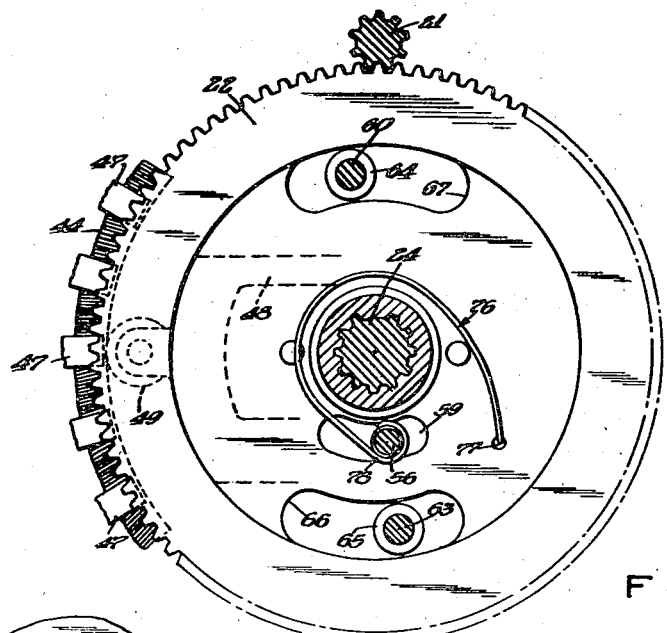
Fig. 6 is a cross-sectional view through a portion of the corrector, taken along the line 6—6 of Fig. 2.

In accordance with the invention, output gear 25 of the corrector 23 is, for all angular positions of the loop, displaced by predetermined amounts with respect to loop gear 22. The mechanism for effecting such continual variable displacement is all incorporated within the corrector housing 32. Loop shaft 24, preferably toothed as shown in the drawings, is secured to hub member 33 centrally mounted within the corrector. As shown in Figs. 3 and 6, one tooth of the connection of shaft 24 to hub 33 is omitted in order to insure an accurate predetermined angular relationship between the shaft and hub during assembly. Drive gear 22 is secured to an annular extension of hub 33 by screws 34.

Figure 4:
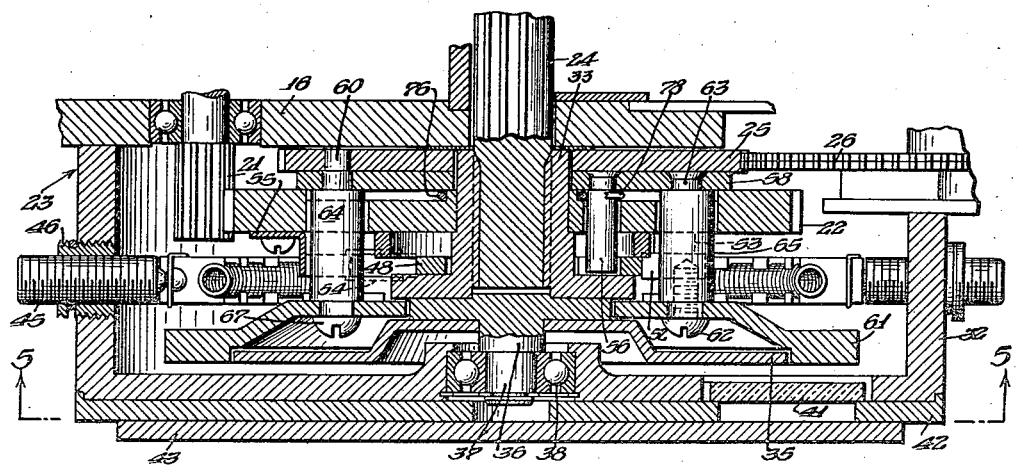
Fig. 4 is a transverse cross-sectional view through the corrector, taken along the broken line 4—4 of Fig. 3.

A 360° loop position indicator dial 35 is fastened to hub 33 by screws 34 across hub end plate 36. An extension 37 from hub end plate 36 is rotatably supported in the bottom center of housing 32 by roller bearing 38. The actual angular position of the loop antenna 10 with respect to its zero-degree position on the aircraft is indicated by a 360° scale on dial 35 read with respect to zero reference line 40 marked on pane 41, as seen in Fig. 4. An escutcheon plate 42 is mounted at the bottom of corrector housing 32, and contains the zero-degree lubber line reference. A removable protective cover or shield 43 is preferably provided across the outer face of the corrector, as shown.

The predetermined angular displacements, corresponding to quadrantal error corrections, are effected between gears 22 and 25 through a cam, cam-follower mechanism within the corrector, as follows. An endless helical spring 44 is supported from circular housing 32 by a plurality of adjusting screws 45 individually threaded in bushing inserts 46. Jaw members 47 are universally linked to adjusting screws 45 and fixedly hold spring 44 in its adjusted configurations. Details of the novel cam spring adjusting means will be hereinafter described in connection with Figs. 7 to 9. The lateral position of adjusting screws 45 are preset in accordance with the quadrantal error corrections to be made.

The configuration of spring 44 is adjusted to correspond with the quadrantal error correction determinations for the installations, and constitutes a cam surface or cam for the corrector. The cam-follower comprises corrector arm 48 on one side of which is mounted a roller 49 that is pressed against the cam surface of spring 44. Corrector arm 48 contains a rectangular slot 50 which coacts with a correspondingly shaped section 51 in hub 33. Corrector arm 48 is accordingly constrained to a linear or lateral displacement with respect to hub 33. Arm 48 is stably supported for such motion by rollers 52, 52 that are rotatably mounted on studs 53, 53 extending from gear 22, and rollers 54, 54 rotatably mounted on spring 55 depending from gear 22.

Corrector arm 48 actuates a vertical pin 56 engaged therewith through a narrow transverse slot 57. Pin 56 extends from an anchor plate 58, as shown in Fig. 4. Pin 56 operates through an elongated arcuate slot 59 in loop gear 22, as seen in Fig. 6 so as not to interfere therewith. Anchor plate 58 is directly connected to position repeater gear 25 through pin 60. A driving connection is thus afforded between corrector arm 48 and output gear 25 through pin 56, anchor plate 58, and pin 60.

When loop gear 22 is rotated, corrector arm 48 is correspondingly turned through hub 33 across hub portion 51, and is also laterally displaced in accordance with the configuration of cam spring 44. The position of output gear 25 accordingly depends upon two factors, namely, the angular position of hub 33 (which is the actual loop position), and the lateral position of corrector arm 48 with respect to hub 33 (which corresponds to the quadrantal error correction). A displacement of corrector arm 48 from its normal position displaces pin 56, which in turn correspondingly angularly displaces gear 25 through anchor plate 58, as will now be understood by those skilled in the art.

Fig. 3 shows pin 56 displaced to the right with respect to its neutral position, by an amount indicated as $+\Delta°$. Thus, the position of output gear 25 is the loop angular position plus the $\Delta°$. Where the configuration of cam spring 44 is such as to displace pin 56 to the left of its neutral position, as shown in dotted lines at 56′, a negative correction angle is superimposed upon output gear 25. The corrector mechanism of the present invention may be readily designed to afford a plus or minus differential or correction for any angular position of the loop, of the order of up to 30° and even more degrees, which range is well above that generally required in practice.

Figure 5:
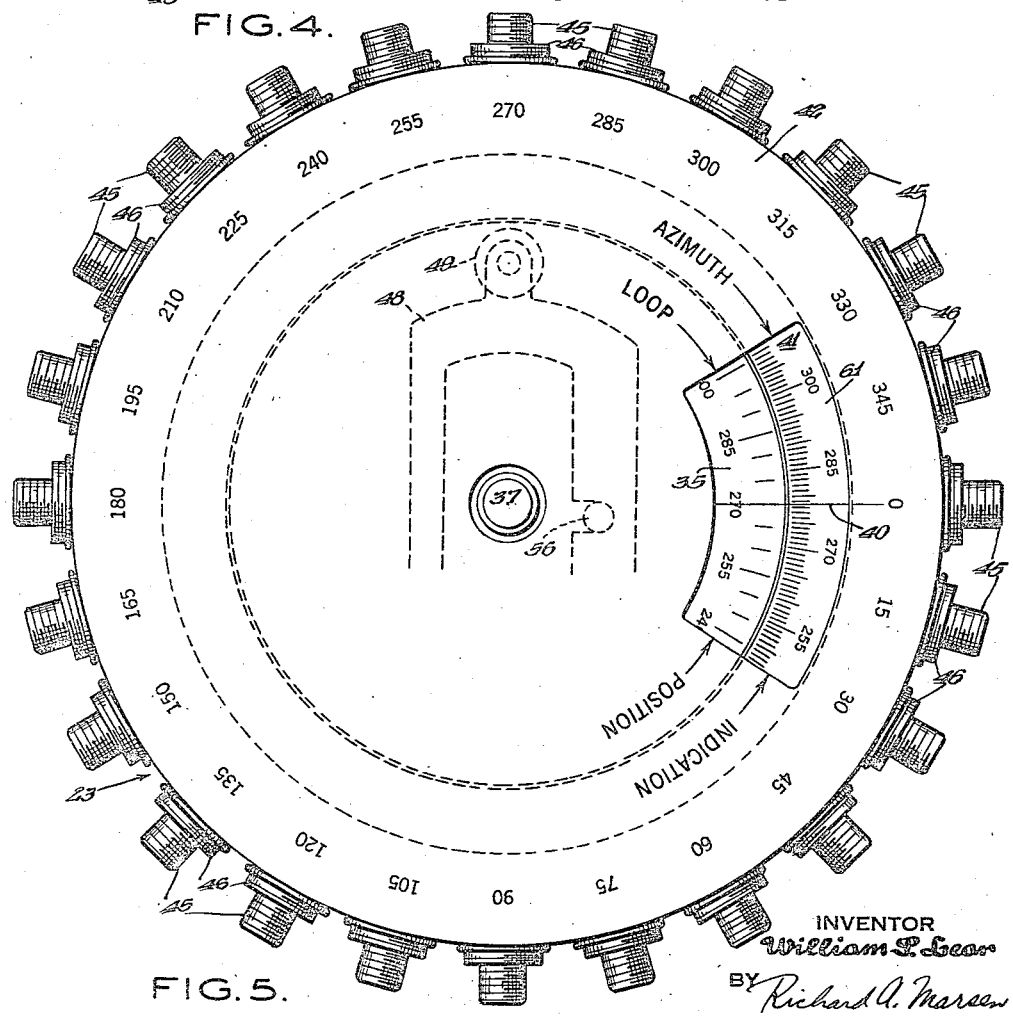
Fig. 5 is a horizontal full face view of the corrector, as seen along the line 5—5 of Fig. 4.

A dial 61 is connected to output gear 25 for directly indicating its angular position with respect to the loop position. Dial 61 includes an annular face concentric about the loop dial 35. The body of dial 61 is supported by screws 62, 62 fastened into studs 60, 63 extending from anchor plate 58 and gear 25. Studs 60, 63 contain concentric rollers 64, 65 respectively. Rollers 64, 65 operate within elongated arcuate slots 66, 67 in loop gear 22, passing through the center of the corrector mechanism without interfering with other components. As seen in Fig. 5 dial 61 contains a 360° scale, and is concentric about the loop position scale on dial 35. The scale indications of dial 61 with respect to lubber line 40 correspond to azimuth indications that are transmitted to unit 28 to the remote repeater unit.

Each angular position of the loop antenna, corresponding to the reading of dial 35 with respect to index 40, has a corresponding corrected bearing indication that is repeated to the remote indicator. The corrected indication appears directly on corrector 23 as the reading of dial 61 with respect to index 40. The corrected bearing indications are derived from corrector 23 through proper adjustment of cam screws 45. The cam spring 44 is adjusted throughout its 360 degrees by means of the closely spaced screws 45 and associated jaws 47. In the preferred embodiment, the cam adjusting members 45, 47 are spaced in 15° intervals about the corrector cam 44. Such spacing in the corrector mechanism of the present invention affords bearing indications corrected to within a fraction of a degree.

In adjusting the cam 44, each screw 45 is turned within its bushing 46 with a socket wrench that engages the recessed end portion 68 of each screw. The amount of cam adjustment required at each screw 45 for correct resultant bearings is determined as follows. The quadrantal errors for the loop antenna installation is determined over 360°, in the usual manner, and charted. The loop antenna 10 is then rotated to each of the twenty-four adjustment positions corresponding to the marked 15° intervals on escutcheon 42. Fig. 5 shows the loop in its 270° position, being the reading of loop dial 35 at index 40. The quadrantal error for each loop position, positive or negative, is read from the correction chart, and the corrected or azimuthal bearing is calculated.

In the example shown in Fig. 5, the correct radio bearing when the loop is at 270°, is 278.5°. To provide such correct bearing, the adjusting screw 45 at the 270° position is turned until the dial 61 reads 278.5° at index 40. The same procedure is repeated for all twenty-four adjustments. When the adjustment process is completed, cam spring 44 will assume the accurate quadrantal error correction curve form which, when coacting with cam-follower roller 49, will actuate output gear 25 so that the remotely repeated azimuthal bearing indication will be correct.

An important feature of the corrector of the invention is the use of the flexible, yet stable, cam spring adjusting units 45—47. Figs. 7, 8 and 9 are enlarged detailed views of one of these units. Each jaw member 47 contains jaws 69, 69 that are gripped about cam spring 44. Jaw member 47 contains a spherical cavity at 70 into which a steel ball 71 is fitted. Ball 71 extends from the end of adjusting screw 45. A spring clip 72 is mounted with a surface slot in member 47 in a manner to close the opening 70 and retain ball 71. Jaw member 47 is accordingly coupled to adjusting screw 45 through a universal joint arrangement. Steel ball 71 is welded to a conical projection 73 of screw 45. A longitudinal displacement of screw 45 correspondingly displaces jaw member 47 and cam spring 44.

The universal joint connection between members 45 and 47 permits cam spring 44 to accurately assume the required quadrantal error configuration. The requisite turning of screw 45 within bushing insert 46 can take place without imparting a corresponding rotational component on jaw member 47. Only a longitudinal displacement of screw 45 is transmitted to cam spring 44. A spring clip 74 is arranged about a peripheral slot in bushing 46 with a straight portion 75 juxtaposed against screw 45. Clips 74 serve to stably hold cam screws 45 against displacement after being set. This is important when used on an aircraft that subjects the corrector to vibration.

A biasing spring 76 is provided within the corrector to continually urge cam-follower roller 49 against cam spring 44. Spring 76 is seen in plan view, in Fig. 6. One end of spring 76 is anchored at an opening 77 in gear 22. The other end 78 of spring 76 is gripped about post 56 that coacts with slot 57 in corrector arm 48. In operation, corrector arm 48 laterally displaces post 56 towards the right in Fig. 3. The corresponding action of spring 76 on post 56 is to urge it towards the left, against cam surface 44. For all angular positions of loop antenna 10, the corresponding stable positions of corrector arm 48, post 56, and output gear 25, accordingly depends solely upon the configuration of cam spring 44 as adjusted through screw members 45.

Although I have set forth a preferred embodiment which my invention may assume in practice, it is to be understood that modifications may be made therein that fall within the broader spirit and scope of the invention, and I do not intend to be limited except as set forth in the following claims.

What is claimed is:

1. In a bearing compensator, a rotatable shaft, a corrector arm in engagement with said shaft whereby said arm and shaft are rotated together, said arm being movable radially in a plane including said shaft, a flexible member in engagement with said arm to position said arm radially relative to said shaft, a plurality of displaceable units individually gripping said flexible member at spaced intervals for establishing a predetermined compensator cam surface, an output disk engaged with said corrector arm for transmitting compensated angular positions by said output disk in correspondence with the shaft positions, a first annular dial attached to said shaft for indicating the shaft orientation, and a second annular dial arranged concentrically about said front dial and secured to said output disk, whereby the compensated bearing positions of said output disk are indicated by said second dial for each reading of said first dial.

2. In a quadrantal error corrector, a rotatable shaft, a corrector arm having a rectangular slot in engagement with said shaft whereby said arm and shaft are rotated together, said arm being movable radially relative to said shaft, an endless flexible member arranged about said arm and shaft, a cam-follower extending from said corrector arm and engaged with said flexible member to position said arm radially relative to said shaft, a plurality of units individually gripping said flexible member in spaced intervals to provide an adjustable outline therein for establishing a predetermined compensator cam surface, an output gear rotatably mounted on said shaft, a pin extending from said output gear and engaged with said corrector arm for transmitting compensated angular positions by said output gear in correspondence with the shaft positions and compensated angular position indicating means operatively associated with said output gear.

3. In a bearing compensator, a rotatable shaft, a gear secured to said shaft, power means operatively associated with said gear for orientating said shaft, a corrector arm in engagement with said shaft whereby said arm and shaft are rotated together, said arm being movable radially in a plane including said shaft, an endless helical spring arranged adjacent said arm, a cam-follower extending from said corrector arm and engaged with said spring to position said arm radially relative to said shaft, a plurality of displaceable units individually gripping said spring at spaced intervals to provide an adjustable outline therein for establishing a predetermined compensator cam surface, each of said units comprising a jaw portion attached to said spring and a screw element flexibly coupled to its associated jaw portion, and an output disk engaged with said corrector arm for transmitting compensated angular positions by said output disk in correspondence with the loop antenna positions.

4. In a bearing compensator, a rotatable shaft, a corrector arm in engagement with said shaft whereby said arm and shaft are rotated together, said arm being movable radially in a plane including said shaft, an endless helical spring arranged about said arm and shaft, a roller extending from said corrector arm and engaged with said spring to position said arm radially relative to said shaft, a plurality of units individually gripping said spring at regularly spaced intervals to provide an adjustable outline therein for establishing a predetermined compensator cam surface, each of said units comprising a jaw portion attached to said spring and an element flexibly coupled with its associated jaw portion, each of the elements being threaded in a frame surrounding said spring and arranged for longitudinal displacement therein substantially in the plane of said spring, and an output disk rotatably mounted on said shaft and engaged with said corrector arm for transmitting compensated angular positions in correspondence with the shaft positions.

5. In a bearing compensator, a rotatable shaft, a corrector arm in engagement with said shaft whereby said arm and shaft are rotated together, said arm being movable radially in a plane including said shaft, an endless helical spring arranged about said arm and shaft, a roller extending from said corrector arm and engaged with said spring to position said arm radially relative to said shaft, a plurality of units individually gripping said spring in regularly spaced intervals to provide an adjustable outline therein for establishing a predetermined compensator cam surface, each of said units comprising a jaw portion attached to said spring and an element flexibly coupled with its associated jaw portion, each of the elements being threaded in a frame surrounding said spring and arranged for longitudinal displacement therein substantially in the plane of said spring, an output disk rotatably mounted on said shaft and engaged with said corrector arm for transmitting compensated angular positions in correspondence with the shaft positions, a first annular dial attached to said shaft for indicating the shaft orientation, and a second annular dial arranged concentrically about said first dial and secured to said output disk, whereby the compensated bearing positions of said output disk are indicated by said second dial for each reading of said first dial.

6. In a bearing compensator, a rotatable shaft, a gear secured to said shaft for imparting rotation thereto, a corrector arm having a rectangular slot in engagement with said shaft whereby said arm and shaft are rotated together, an endless helical spring in engagement with said arm, a plurality of units individually gripping said spring at spaced intervals for establishing a predetermined compensator cam surface, each of said units comprising a jaw portion attached to said spring and a screw element universally coupled to its associated jaw portion, each of the screw elements being threaded in a frame surrounding said spring and arranged for longitudinal displacement therein substantially in the plane of said spring, an output disk rotatably mounted on said shaft, and a pin extending from said output disk through a slot in said gear and engaged with said corrector arm for transmitting compensated angular positions in correspondence with the gear positions.

7. In a bearing compensator, a rotatable shaft, a gear secured to said shaft for imparting rotation thereto, a corrector arm having a rectangular slot in engagement with said shaft whereby said arm and shaft are rotated together, an endless helical spring in engagement with said arm, a plurality of units individually gripping said spring at spaced intervals for establishing a predetermined compensator cam surface, each of said units comprising a jaw portion attached to said spring and a screw element universally coupled to its associated jaw portion, each of the screw elements being threaded in a frame surrounding said spring and arranged for longitudinal displacement therein substantially in the plane of said spring, an output disk rotatably mounted on said shaft, a pin extending from said output disk through a slot in said gear and engaged with said corrector arm for transmitting compensated angular positions in correspondence with the gear positions, a first annular dial attached to said shaft for indicating the shaft orientation, a second annular dial arranged concentrically about said first dial, and posts extending from said output disk through slots in said gear for securing said second dial with said output disk, whereby the compensated bearing positions of said output disk are indicated by said second dial for each reading of said first dial.

8. In a bearing compensator, an endless spring, a plurality of spaced adjusting members attached to said spring for predetermining its outline and constituting a cam surface, each of said members comprising a jaw unit gripped to said spring, a screw element threaded for longitudinal displacement in a frame about said spring, and a universal joint connection between each unit and its associated screw element including a ball extending from the inner ends of the screw elements and engaged with a corresponding socket in the units.

9. In a bearing compensator, an endless helical spring, a plurality of regularly spaced adjusting members attached to said spring for predetermining its outline and constituting a cam surface, each of said members comprising a jaw unit gripped to said spring, a screw element threaded for longitudinal displacement in a frame about said spring, and a universal joint connection between each unit and its associated screw element including a ball extending from the inner ends of the screw elements and engaged with a corresponding socket in the units, and a lock spring about each unit for holding each ball in the sockets.

10. In a bearing compensator, a rotatable shaft, a gear secured to said shaft, means operatively associated with said gear for orienting said shaft, a corrector arm mounted on said shaft and movable radially thereof, elements mounted on said gear and engaging said arm to prevent rotation thereof relative to said shaft, a flexible member in engagement with said arm, a plurality of displaceable units individually gripping said member at spaced intervals for establishing a predetermined compensator cam surface and mechanism operatively associated with said corrector arm for indicating compensated bearing positions of said shaft.

11. In a bearing compensator, a rotatable shaft, a gear secured to said shaft, means operatively associated with said gear for orienting said shaft, a corrector arm mounted on said shaft and movable radially thereof, roller elements mounted on said gear and engaging said arm to prevent rotation thereof relative to said shaft, a flexible member in engagement with said arm, a plurality of displaceable units individually gripping said member at spaced intervals for establishing a predetermined compensator cam surface and mechanism operatively associated with said corrector arm for indicating compensated bearing positions of said shaft.

12. In a bearing compensator, a rotatable shaft, a gear secured to said shaft, means operatively associated with said gear for orienting said shaft, a corrector arm mounted on said shaft and movable radially thereof, roller elements mounted on said gear and engaging one side of said arm, a spring secured to said gear, roller elements mounted on said spring and engaging the other side of said arm to prevent rotation thereof relative to said shaft, said roller elements acting to prevent relative rotation of said shaft and said arm, a flexible member in engagement with said arm, a plurality of displaceable units individually gripping said member at spaced intervals for establishing a predetermined compensator cam surface and mechanism operatively associated with said corrector arm for indicating compensated bearing positions of said shaft.

13. In a bearing compensator, a rotatable shaft, a gear secured to said shaft, means operatively associated with said gear for orienting said shaft, a corrector arm mounted on said shaft and movable radially thereof, elements mounted on said gear and engaging said arm to prevent rotation thereof relative to said shaft, a flexible member in engagement with said arm, a plurality of displaceable units individually gripping said member at spaced intervals for establishing a predetermined compensator cam surface, mechanism operatively associated with said corrector arm for indicating compensated bearing positions of said shaft and resilient means urging said arm toward said flexible member.

14. In a bearing compensator, a rotatable shaft, a gear secured to said shaft, means operatively associated with said gear for orienting said shaft, a corrector arm mounted on said shaft and movable radially thereof, elements mounted on said gear and engaging said arm to prevent rotation thereof relative to said shaft, a flexible member in engagement with said arm, a plurality of displaceable units individually gripping said member at spaced intervals for establishing a predetermined compensator cam surface, mechanism operatively associated with said corrector arm for indicating compensated bearing positions of said shaft and a spring having one end engaging said gear and the other end operatively associated with said arm to urge the latter toward said flexible member.

15. In a bearing compensator, a rotatable shaft, a gear secured to said shaft, means operatively associated with said gear for orienting said shaft, a corrector arm mounted on said shaft and movable radially thereof, elements mounted on said gear and engaging said arm to prevent rotation thereof relative to said shaft, a flexible member in engagement with said arm, a plurality of displaceable units individually gripping said member at spaced intervals for establishing a predetermined compensator cam surface, mechanism operatively associated with said corrector arm for indicating compensated bearing positions of said shaft, a pin secured to said mechanism and engaging said arm and a spring having one end engaging said gear and the other end engaging said pin to urge said arm toward said flexible member.

WILLIAM P. LEAR.